(12) United States Patent
Chatras et al.

(10) Patent No.: US 10,594,603 B2
(45) Date of Patent: Mar. 17, 2020

(54) TRANSMISSION OF PACKETS RELATING TO A PROCESSING RULE

(71) Applicant: ORANGE, Paris (FR)

(72) Inventors: Bruno Chatras, Paris (FR); Youssef Chadli, Houilles (FR)

(73) Assignee: Orange, Paris (FR)

( * ) Notice: Subject to any disclaimer, the term of this patent is extended or adjusted under 35 U.S.C. 154(b) by 146 days.

(21) Appl. No.: 15/524,335

(22) PCT Filed: Oct. 28, 2015

(86) PCT No.: PCT/FR2015/052907
§ 371 (c)(1),
(2) Date: May 4, 2017

(87) PCT Pub. No.: WO2016/071606
PCT Pub. Date: May 12, 2016

(65) Prior Publication Data
US 2017/0324656 A1 Nov. 9, 2017

(30) Foreign Application Priority Data

Nov. 5, 2014 (FR) .................................. 14 60701

(51) Int. Cl.
*H04L 12/715* (2013.01)
*H04L 29/08* (2006.01)
*H04L 29/06* (2006.01)
*H04L 12/721* (2013.01)
*H04L 12/14* (2006.01)

(52) U.S. Cl.
CPC .............. *H04L 45/64* (2013.01); *H04L 45/38* (2013.01); *H04L 67/125* (2013.01); *H04L 69/16* (2013.01); *H04L 69/22* (2013.01); *H04L 12/1407* (2013.01)

(58) Field of Classification Search
CPC ....... H04L 45/64; H04L 67/125; H04L 69/16; H04L 69/22; H04L 45/38; H04L 12/1407
See application file for complete search history.

(56) References Cited

U.S. PATENT DOCUMENTS

2004/0252701 A1\* 12/2004 Anandakumar ......... H04B 7/06
370/395.21
2011/0092244 A1\* 4/2011 Lee ..................... H04W 52/226
455/522

(Continued)

OTHER PUBLICATIONS

Egilmez, Hilmi et al., "Open Qos: An Open Flow Controller Design for Multimedia Delivery with End-to-End Quality of Service over Software-Defined Networks".

*Primary Examiner* — Omar J Ghowrwal
(74) *Attorney, Agent, or Firm* — Haverstock & Owens LLP (57) ABSTRACT

The invention relates to a method of controlling a packet stream generated by an application (APP) installed in a mobile terminal (UE), the stream being intended to be sent by the terminal over a communications network managed by an operator, the method comprising the following steps implemented in the terminal, for all or some of the packets generated by the application: obtaining and analysis of a packet, termed the first packet (P1), sending by the terminal of a second packet (P2) based on the first packet and conforming to at least one processing rule established by the operator, as a function of the result of the analysis and if the result of the analysis permits the sending.

7 Claims, 3 Drawing Sheets

(56) References Cited

U.S. PATENT DOCUMENTS

| | | | |
|---|---|---|---|
| 2012/0027016 A1* | 2/2012 | Filsfils | H04L 45/30 370/392 |
| 2012/0131222 A1* | 5/2012 | Curtis | H04L 47/2441 709/235 |
| 2014/0254373 A1 | 9/2014 | Varma | |
| 2019/0140924 A1* | 5/2019 | Koponen | H04L 47/125 |

* cited by examiner

TRANSMISSION OF PACKETS RELATING TO A PROCESSING RULE

1. FIELD OF THE INVENTION

The application for invention lies in the field of mobile networks allowing packet-mode operation and incorporating advanced service quality control functions, such as the so-called 3G, 4G or 5G (for $3^{rd}$, $4^{th}$ or $5^{th}$ generation) networks.

The 4G networks are also known as LTE ("Long Term Evolution") networks. 5G network denotes, hereinafter in this document, any network of a generation subsequent to LTE.

2. STATE OF THE ART

In the 3G and 4G networks, the PCC (Policy and Charging Control) architecture defined in the standard TS 23.203 by the 3GPP (Third Generation Partnership Project) allows an operator of these networks to dynamically apply policies for resource allocation and charging based on several criteria such as the profile of the users, the resources available, the characteristics and needs of the applications used. The policies to be applied are determined by an entity called PCRF (Policy and Charging Rule Function) which transmits them to entities called PCEF (Policy and Charging Enforcement Function) situated in the equipment items responsible for traffic routing. In the case where the PCC architecture is incorporated in the EPC (Evolved Packet Core) architecture, also defined by the 3GPP, a PCEF entity resides in the P-GW (Packet Data Network Gateway) equipment item giving access to the external networks, in particular to the Internet. The control of the quality of service is then based on a "bearer" concept which represents the transport resources allocated to a set of traffic streams that have to be subjected to one and the same processing from the quality of service point of view. Each "bearer" has associated quality of service parameters to be taken into account by the PCEF and the other equipment items included on the path of the data streams. These parameters can be:
- QCI (Qos Class Identifier): identifier for the quality of service class;
- ARP (Allocation Retention Priority): priority for the allocation and retention of resources;
- MBR (Maximum Bit Rate), AMER (Average MBR), GBR (Guaranteed Bit Rate): maximum bit rate, average maximum bit rate, guaranteed bit rate, in the downlink and uplink directions.

For example, a PCRF entity transmits to the PCEF rules authorizing or not authorizing the establishment of a "bearer" with a given quality of service, possibly limiting the bandwidth that can be used for this "bearer", authorizing or not authorizing the transmission of a packet transmitted by a terminal or intended for this terminal on this "bearer" based on the header fields of the packet. The rules linked to the transmission of packets within a "bearer" are also transmitted to the terminal. It is considered that their application is performed in a software module that cannot be modified by the user. Typically, in a terminal of smartphone type with a two-processor architecture, the application of the rules is performed by software running in the baseband processor (sometimes called modem) and is not an application running the applications processor.

In the 5G networks, it is envisaged that the quality of service be managed directly at the IP layer level, in particular by relying on the marking, by the applications run by the terminal, of the packets transmitted by the applications, according to the Diffserv mechanism defined in the RFC2475 standard by the IETF (Internet Engineering Task Force). It remains possible for the operator to perform a certain number of checks, but with drawbacks relating to the quality of service, the authorization mechanism, and the processing of the uplink bandwidth.

In effect, the quality of service for the packets transmitted by a terminal up to the 5G equivalent of the P-GW will be dependent only on the marking applied by the terminal or by the application itself, with no connection to the policies of the operator.

Furthermore, any blocking of packets to unauthorized destinations will be able to be performed only at the level of the 5 G equivalent of the P-GW, the path between the terminal and P-GW pointlessly consuming bandwidth resources.

Finally, any exceeding of uplink bandwidth will be able to be treated only at the level of the 5G equivalent of the P-GW, but only after the excess packets have followed a path on which the bandwidth is pointlessly used.

One of the aims of the invention is to remedy these drawbacks of the prior art.

3. SUMMARY OF THE INVENTION

The object of the invention to remedy these drawbacks by having the terminal perform the controls imposed by the operator before the transmission of a packet. It can also be applicable in the context of an evolution of the 3 G or 4 G networks with quality of service differentiated within a "bearer".

The invention improves the situation using a method for controlling a packet stream generated by an application installed in a mobile terminal, the stream being intended to be transmitted by the terminal over a communications network managed by an operator, the method comprising the following steps implemented in the terminal, for all or some of the packets generated by the application;
- obtaining and analysis of a packet, called first packet,
- transmission by the terminal of a second packet based on the first packet and conforming to at least one processing rule established by the operator, based on the result of the analysis and if the result of the analysis authorizes the transmission.

Contrary to the prior art, the terminal itself analyzes and can therefore itself decide whether it can transmit a packet, and how it must do so, that is to say with what QoS parameters of the packet, without using a request to an external gateway, such as the P-GW, and without the latter previously establishing a "bearer". Since the terminal itself applies the packet transmission policies, under the control of the operator, it is therefore no longer necessary to establish a "bearer" prior to the transmission of packets.

According to one aspect of the invention, the analysis step comprises the following steps:
- a step of transmission of a request message to a security module installed in the terminal, the request message comprising at least one parameter based on the first packet,
- a step of reception of a response message from the security module, the response message comprising an instruction relating to the transmission of the second packet, the instruction being based on the at least one parameter and established according to the at least one processing rule.

When the processing to be applied to a packet cannot be immediately identified, contrary to the prior art in which a network element external to the terminal is interrogated, the terminal interrogates a security module, software or hardware, installed in the terminal, that can be included in a UICC (Universal Integrated Circuit Card) card also known as SIM (Subscriber Identification Module) card, or in the equivalent to a UICC card for the 5G networks.

According to one aspect of the invention, the request message comprises at least a part of the first packet.

The parameters transmitted in the request message can, for example, be parameters included in the header of the first packet, such as, for example, the DiffServ code, the destination IP address, the destination port, or the transport protocol to be used. The header of a packet, for example, contains information on the nature of the packet stream and on the quality of service that such a stream requires or must receive. A part of the header of the first packet can therefore be sufficient for the request message to be correctly processed by its recipient, which simplifies the construction of the request message.

According to one aspect of the invention, the step of reception of a response message is followed by a step of addition, in a table, of a routine rule based on the instruction and intended to be applied to packets of the stream following the first packet.

By virtue of this aspect, the steps of interrogation of the security module are avoided, for all the packets of a stream apart from the first which is the only one for which the analysis required the interrogation of the security module. The analysis is simplified and is reduced to the application of a routine rule based on an instruction which is itself based on a processing rule established by the operator.

According to another aspect of the invention, the analysis step comprises a step of searching, in the table, for a routine rule that can be associated with the first packet. In other words, the complete analysis with interrogation of the security module is necessary only for the first packet of one and the same application stream.

According to one aspect of the invention, the request message comprises the first packet and the response message comprises the second packet.

By virtue of this aspect, the so-called "packet-in/packet-out" mechanism of a protocol such as OpenFlow can be used between the terminal and its security module. In such a protocol, when a flow transmitter receives the first packet of a new stream, it interrogates a controller, called OpenFlow controller, in order to know how to route the stream. It does so by transmitting this first packet, called packet-in, to the controller. The controller responds by returning to it a packet called packet-out, identical to the packet-in except for the header which is modified to include all the instructions necessary to the correct routing, not only of this first packet but also of the subsequent packets in the stream.

According to this aspect, the first packet of the method is a packet-in, the second packet is a packet-out, and the security module, that is to say for example the SIM card, comprises an OpenFlow controller.

According to one aspect of the invention, a packet comprises a header and payload data, and the second packet based on the first comprises a header different from the header of the first packet.

By virtue of this aspect, the payload data in the packets of a stream are not modified in a second packet. It is the header of the packets which is modified and contains indications on the processing to be applied to the stream.

The various aspects of the control method which have just been described can be implemented independently of one another or in combination with one another.

The invention relates also to a method for determining an instruction relating to the transmission of a first packet included in a packet stream generated by an application installed in a mobile terminal, the stream being intended to be transmitted over a communications network managed by an operator, the method being implemented in a security module comprising at least one processing rule established by the operator, the method comprising the following steps:
  a step of reception of a request message from the terminal, the request message comprising at least one parameter based on the first packet,
  determination of an instruction relating to the transmission of a second packet based on the at least one parameter, according to the at least one processing rule,
  a step of transmission of a response message to the terminal, the response message comprising the determined instruction.

Contrary to the prior art, where the processing rules specific to an operator are stored in elements of the network (PORE, PCEF function of the P-GW), a terminal implementing the determination method according to the invention can strictly apply the packet transmission policies as they are determined by the operator thereof, and do so without involving a request to the network, because the processing rules are stored in the security module.

This security module is local to the terminal, and is a software or hardware module, that can be included in a UICC (Universal Integrated. Circuit Card) card, also known as SIM (Subscriber Identification Module) card, or in the equivalent of a UICC card for the 5G networks. Since the content of the SIM card is controlled exclusively via the operator to which the user of the subscriber subscribes, the integrity and the authenticity of the processing rules which are applied to the packets are assured. In other words, the level of security of a SIM card prevents its content from being modified by anyone other than the operator who has provided the SIM card to the user of the terminal. Thus, it is not possible for the user to modify the stream processing rules, rules which are specific to the operator and to the manner in which it manages its network.

According to one aspect of the invention, the determination method comprises a preliminary step of obtaining the at least one processing rule from a network node managed by the operator.

By virtue of this aspect, the processing rules used by the security module to determine transmission instructions can be downloaded or updated in line with changes to the packet transmission policies of the operator, from an entity situated in the control plan of the network operator, using a suitable protocol.

The invention relates also to a security module intended to be installed in a mobile terminal capable of transmitting a packet stream generated by an application installed in the mobile terminal and intended to be transmitted over a communications network managed by an operator, the security module comprising:
  a module for obtaining and storing at least one processing rule established by the operator,
  a module for receiving a request message from the terminal, the request message comprising at least one parameter based on a packet of the stream,
  a module for determining an instruction relating to the transmission of the packet of the stream, according to the at least one processing rule, a module for transmitting a response message to the terminal, the response message comprising the determined instruction.

Such a security module is capable of implementing, in all its embodiments, the determination method which has just been described. It can be installed in a SIM card or one of its variants such as mini-SIM or micro-SIM, it being understood that such a card can be removably inserted into a mobile terminal.

Alternatively, this security module may be incorporated non-removably in the electronics of the terminal, in the form of a module known as "Soft-SIM" (software SIM).

The invention relates also to a mobile terminal capable of transmitting a packet stream generated by an application installed in the mobile terminal and intended to be transmitted over a communications network managed by an operator, the terminal comprising:
  a module for obtaining a packet, called first packet,
  a module for analyzing the first packet,
  a module for transmitting, from the terminal, a second packet based on the first packet and conforming to at least one processing rule established by the operator, according to the result of the analysis.

The control method described above is intended to be implemented, in any one of its embodiments, in such a mobile terminal, equipped or not with a SIM card or a soft-SIM module.

According to one aspect of the invention, the mobile terminal comprises at least one security module such as that which has just been described.

The control method described above can be implemented in a terminal capable of operating with one or more operators, each operator managing a security module installed in the terminal in the form of a soft-SIM module.

The invention relates also to a system comprising a mobile terminal and at least one security module.

The control method can be implemented together with the determination method described above, in a system combining a terminal and at least one security module installed in the terminal in the form of a SIM card managed by an operator. Such a system can also comprise a terminal and a combination of at least one SIM card with at least one soft-SIM module.

The invention relates also to a computer program comprising instructions for implementing the steps of the control method which has just been described, when this method is executed by a processor.

The invention relates also to a storage medium that can be read by a mobile terminal, on which is stored the program which has just been described, capable of using any programming language, and of being in the form of source code, object code, or intermediate code between source code and object code, such as in a partially compiled form, or in any other desirable form.

The invention relates also to a computer program comprising instructions for implementing the steps of the determination method which has just been described, when this method is executed by a processor.

The invention relates finally to a storage medium that can be read by a security module such as, for example, a SIM card, on which is stored the program which has just been described, able to use any programming language, and to be in the form of source code, object code, or intermediate code between source code and object code, such as in a partially compiled form, or in any other desirable form.

4. DESCRIPTION OF THE FIGURES

Other advantages and features of the invention will become more clearly apparent on reading the following description of a particular embodiment of the invention, given as a purely illustrative and nonlimiting example, and the attached drawings, in which.

5. DETAILED DESCRIPTION OF AT LEAST ONE EMBODIMENT OF THE INVENTION

Hereinafter in the description, examples of a number of embodiments of the invention are presented based on the LTE standards, but the invention applies also to other standards such as 3G, for example with a quality of service differentiated within a "bearer", or to future standards such as 5G.

Figure 1:
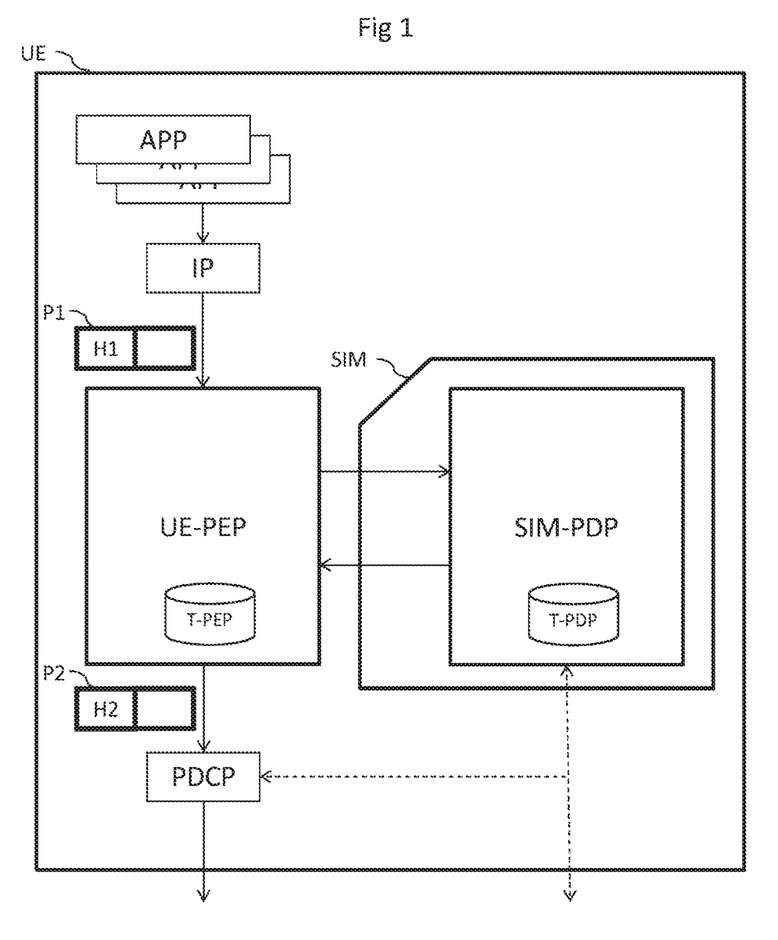
FIG. 1 presents an example of overview of a mobile terminal and of a security module, according to one aspect of the invention, FIG. 2 schematically presents an example of implementation of the steps of a control method, according; to the invention, FIG. 3 schematically presents an example of implementation of the steps of a determination method, according to the invention.

FIG. 1 presents an example of overview of a mobile terminal and of a security module, according to one aspect of the invention, A SIM-PDP module controlling the packet streams transmitted by the terminal is installed on the SIM card (UICC) of the mobile terminal. Since the SIM card possesses the advantage of not being able to be modified by the user, this module profits from this advantage.

The SIM-PDP module acts as PDP (Policy Decision Point, decision point based on a policy) within the meaning of the RFC2753 standard, and the terminal, or more specifically the UE-PEP module of the terminal which is preferably implemented in a part of the terminal that cannot be modified by the user, acts as PEP ("Policy Enforcement Point") within the meaning of the RFC2753 standard.

As illustrated in FIG. 1, one of the applications APP, downloaded by the terminal or native, transmits to the IP layer of the terminal the packets P1 that it wants to transmit, after having possibly marked them using a DiffServ code. Before transmitting a packet P1 to the underlying layers (for example the PDCP layer in LTE, PDCP standard for "Packet Data Convergence Protocol", a convergence protocol for transporting data in packet mode), the IP layer transmits the packet P1 to the UE-PEP module which seeks the advice of the SIM-PDP module, which responds to the UE-PEP module by giving it the appropriate instructions, for example allowing or not allowing the packet to pass, modifying such or such a field of the header H1 of the packet P1 (for example the DiffServ code). The packet. P2 actually transmitted by the terminal can therefore be different from the packet P1, in particular its header H2 compared to the header H1. The SIM-PDP module can also provide instructions which are applied to all the packets corresponding to one and the same packet stream (for example, a bandwidth limitation).

The SIM-PDP module determines the instructions to be transmitted according to processing rules determined by the policy of the operator, and according to the profile of the user, the type of stream, etc. Each processing rule associates one or more actions with one or more conditions relating typically to the values of the fields of the header H1 of the packet P1. These rules can have been loaded on creation of the SIM card.

Furthermore, for optimization reasons, the SIM-PDP module can supply the UE-PEP module with a list of rules when the terminal is started up, or in response to a request from the UE-PEP module concerning a particular packet. In order to exploit these rules, before soliciting the SIM-PDP module, the UE-PEP module therefore checks in a table T-PEP to see if it does not already have rules, called routine rules, concerning how to process the packet P1.

The SIM-PDP module can also receive an update of the rules, directly from an element of the network managed by the operator, for example by using the OTA ("Over The Air") mechanism defined by OMA ("Open Mobile Alliance") organism.

Figure 2:
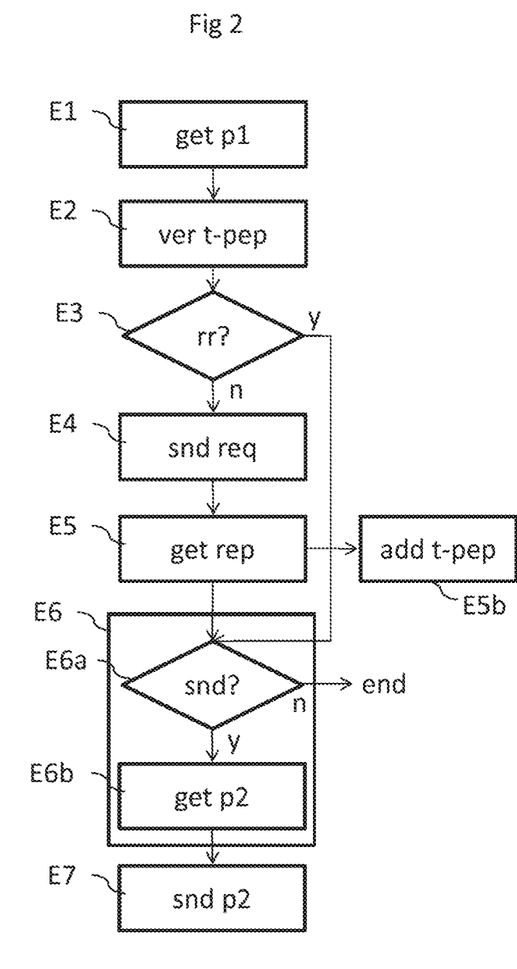

FIG. 2 schematically presents an example of implementation of the steps of a control method, according to the invention.

The control method allows a terminal to perform controls imposed by the operator before the transmission of a packet.

In a step E1, a UE-PEP module of the terminal, called control module, obtains a packet P1 forming part of a packet stream generated by a communication application running on the terminal.

Based on both the parameters present in the header H1 of the packet P1, and on the network management policy of the operator to which the terminal is attached by subscription, different processing operations can be applied to the packet P1 and possibly to the other packets of the same stream. The control module is responsible for controlling that.

In a step E2, the control module therefore checks in a table T-PEP to see if it includes an instruction, called routine instruction, corresponding to the processing that the packet P1 must undergo. This is done for example by searching in the table T-PEP for an instruction with an identifier of the stream identical to that to which the packet P1 belongs, this identifier being included in the header H1 of the packet P1.

In a switching step E3, the method continues to a step E4 if such a routine instruction does not exist or branches to an execution step HG, described below, if the routine instruction exists.

In a step E4, the control module transmits a request message to a security module SIM-PDP, the request message comprising at least a part of the header H1 of the packet P1. The aim of this request message is to determine what processing has to be applied by the terminal to the packet P1. This processing must conform to the stream management policy of the operator on its network, and this is why the security module SIM—PDP is secured for the processing rules that it comprises to be modifiable only by the operator.

In a step E5, the control module receives a response message from the security module SIM-PDP, the response message comprising an instruction relating to the packet P1, established according to a processing rule specific to the operator.

In an optional step E5b following the step E5, the control module adds the receive instruction to the table T-PEP.

In a step E6, the instruction received in the step E5, relating to the packet P1, is executed by the control module UE-PEP. This step comprises a first switching sub-step E6a, in which the method continues to a second sub-step E6b if the instruction comprises an authorization to transmit the packet P1, or branches to a step E8 if the instruction comprises a prohibition to transmit the packet P1.

In the sub-step E6b, the control module prepares a packet P2 to be transmitted, which can differ from the packet. P1 according to the instruction. For example, the instruction received may be to modify the header field containing the DiffServ code which is used to establish the priority with which the packet will be routed in the network.

Generally, the packet P2 differs from the packet P1 only by its header H2 and not by the payload data that it contains.

Finally, in a step E7, the terminal transmits the packet P2, with the same payload data as the packet P1, and with a header H2 that is possibly different from the header H1 of the packet P1.

In the step E8 executed in the case of prohibition to transmit the packet P1, the terminal prevents the transmission of the packet P1, and, if necessary, prevents the transmission of packets of the same stream as P1. The application which has generated the packet P1 may possibly detect that its packets are not transmitted and may terminate this stream.

It will be understood that the steps E4 and E5 are performed only for a first packet of a new stream, and not for the subsequent packets of this stream.

Figure 3:
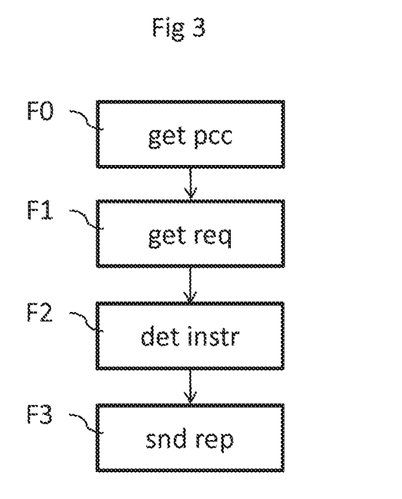

FIG. 3 schematically presents an example of implementation of the steps of a determination method, according to the invention.

The determination method enables a terminal to determine what controls imposed by the operator have to be performed before the transmission of a packet.

In a step F1, a module SIM-PDP accessible to the terminal, called security module, receives a request message from the terminal, the request message comprising at least a part of the packet P1, generally all or part of its header H1. In one embodiment, the request message can also comprise the entire packet P1. This request message corresponds to the one which is transmitted in the step E4 of the control method which has just been described in relation to FIG. 2.

In a step F2, the security module determines an instruction relating to the transmission of the packet P1, based on a table T-PDP of processing rules. This table T-PDP comprises the processing rules conforming to the stream management policy of the operator on its network. The rule which must be applied to the packet P1 depends on parameters characterizing the stream to which P1 belongs and included in the request message, such as, for example, the DiffServ code, or the destination IP address, the destination port, the transport protocol (UDP or TOP), which are also parameters of the header H1 of the packet P1.

The instruction may be to transmit a packet P2, with the same payload data as the packet P1, and with a header H2 possibly different from the header H1 of the packet P1, or it may be to not transmit the packet at all.

If the instruction is to transmit a packet P2, the content of this packet is also determined in this step F2.

In a step F3, the security module transmits to the terminal a response message comprising the determined instruction. This response message corresponds to the one which is received in the step E5 of the control method which has just been described in relation to FIG. 2.

In a step F0, independent of the step F1, the security module obtains at least one processing rule established by the operator, by a suitable protocol, and stores it in the table T-PDP. Processing rules may have been installed initially upon the customization of the SIM card, then be updated according to the changes of policy of the operator, for example by using the OTA radio mechanism.

The request message, like the response message, can take several forms. For example, the communication between the terminal and the security module can be implemented by establishing a TCP channel between the two entities, according to the procedures specified in the standard ETSI TS 102 223 ("Open Channel related to UICC server mode"). Such a channel is capable of conveying an application protocol such as OpenFlow for example.

The SIM-PDP module of the SIM card then acts as OpenFlow controller whereas the UE-PEP module of the terminal acts as OpenFlow router. Before transmitting a packet to the outside, the UE-PDP module checks (step E2) if it locally has the rule making it possible to determine how to process it and otherwise transmits it (steps E4, E1) to the SIM-PDP module by means of the Packet-In message. The SIM-PDP module examines the packet (step F2) and responds (steps F3, E5) with a packet-out message containing this packet, possibly modified (step F2b), and a list of actions, typically "set-queue" to direct the packet to a queue and "output on port X" in which port X denotes an output interface to authorize its propagation (steps E6, E7). Furthermore, to avoid overloading the SIM card by transmitting to it all the packets to be transmitted by the terminal, the UE-PEP module is configured (step E5b) such that the next packets of the same stream can be processed autonomously by the latter (steps E3, E6). For that, the SIM-PDP module can transmit to the UE-PEP module a table configuration command in the form of a "modify flow entry" message (OFPT_FLOW_MOD), in addition to the Packet-Out message.

An alternative implementation consists in upgrading the interface between terminal and security module to introduce therein messages specific to the application exchanges between the two entities.

Figure 4:
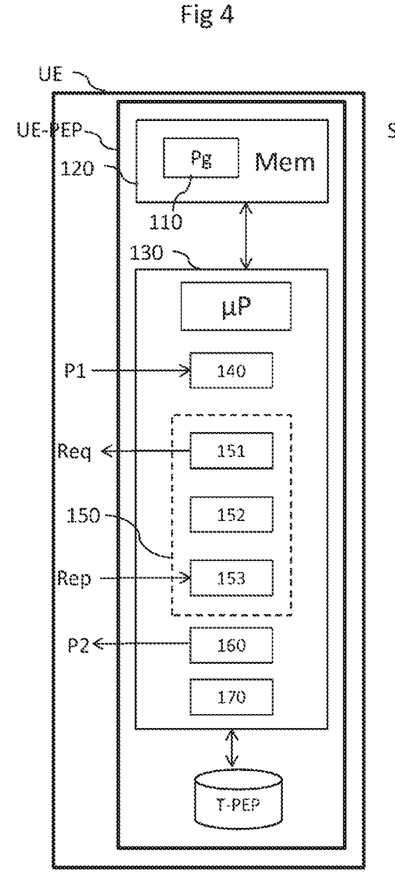
FIG. 4 presents an example of structure of a mobile terminal implementing the control method, according to one aspect of the invention.

In relation to FIG. 4, there now follows a description of an example of structure of a mobile terminal implementing the control method, according to one aspect of the invention.

The UE-PEP module implements the control method, different embodiments of which have just been described.

Such a UE-PEP module can be implemented in a mobile terminal UE capable of connecting to an LTE or later generation network.

For example, the UE-PEP module comprises a processing unit 130, possibly equipped with a microprocessor and driven by a computer program 110, stored in a memory 120 and implementing the control method according to the invention. On initialization the code instructions of the computer program 110 are for example loaded into a RAM memory, before being executed by the processor of the processing unit 130.

Such a UE-PEP module comprises:
an obtaining module 140, capable of obtaining a packet P1 generated by an application installed in the mobile terminal UE, the packet P1 forming part of a stream intended to be transmitted by the terminal over a communications network managed by an operator,
an analysis module 150, capable of analyzing the packet P1 using at least one processing rule established by the operator or at least one routine rule stored in a table T-PEP included in the terminal UE,
a transmission module 160, capable of transmitting a packet P2 based on the packet P1 and in accordance with at least one processing rule established by the operator, according to the result of the analysis, and if the result of the analysis authorizes the transmission,
an addition module 170, capable of adding a routine rule to the table T-PEP based on the result of the analysis and intended to be applied to packets of the stream following the packet P1.

The UE-PEP module may also comprise:
a transmission module 151, capable of transmitting a request message Req to a security module SIM-PDP, the request message comprising at least one parameter based on the packet P1,
a reception module 152, capable of receiving a response message Rep from the security module SIM-PDP, the response message comprising an instruction relating to the packet P1 established according to at least one processing rule established by the operator,
a search module 153, capable of searching in the table T-PEP for a routine rule corresponding to the packet P1.

Figure 5:
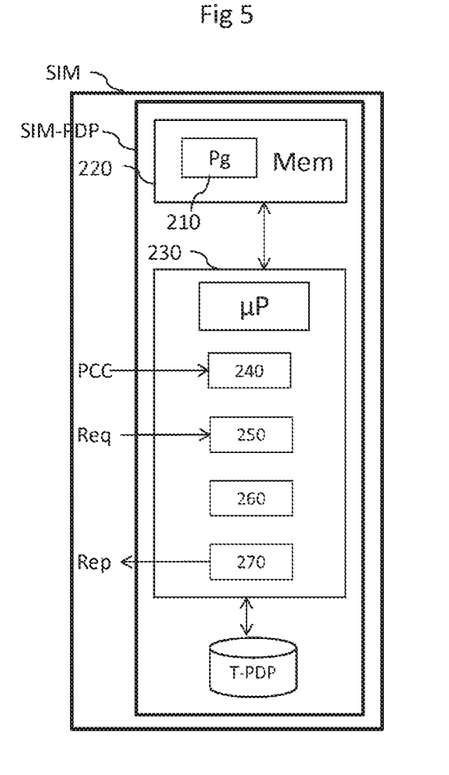
FIG. 5 presents an example of structure of a security module implementing the determination method, according to one aspect of the invention.

In relation to FIG. 5, there now follows a description of an example of structure of a security module implementing the determination method, according to one aspect of the invention.

The SIM-POP module implements the determination method, different embodiments of which have just been described.

Such a SIM-POP module can be implemented for example in a SIM, mini-SIM or micro-SIM card. Such a SIM-POP module can also be implemented in a software module incorporated in the electronics of the terminal UE, known as soft-SIM. The term. "SIM card" used below designates any of these embodiments, including SIM, mini-SIM, micro-SIM and soft-SIM.

For example, the SIM-POP module comprises a processor unit 230, equipped for example with a microprocessor μP, and driven by a computer program 210, stored in a memory 220 and implementing the determination method according to the invention. On initialization, the code instructions of the computer program 210 are for example loaded into a RAN memory, before being executed by the processor of the processing unit 230.

Such a SIM-PDP module comprises:
an obtaining module 240, capable of obtaining at least one processing rule P00 established by an operator and of storing it in a table T-PDP,
a reception module 250, capable of receiving a request message Req from the terminal, the request message comprising at least one parameter based on a packet P1 generated by an application installed in the mobile terminal UE associated with the SIM card, the packet P1 forming part of a stream intended to be transmitted by the terminal. UE over a communications network managed by the operator,
a determination module 260, capable of determining an instruction relating to the transmission of the packet of the stream, including, if necessary, the content of a packet P2 based on the packet P1, according to at least one processing rule included in the table T-PDP,
a transmission module 270, capable of transmitting a response message Rep to the terminal UE, the response message comprising the determined instruction.

The modules described in relation to FIGS. 4 and 5 can be hardware or software modules.

The invention claimed is:
1. A method for controlling a packet stream generated by an application installed in a mobile terminal, the stream being intended to be transmitted by the terminal over a communications network managed by an operator, the method comprising implemented in the terminal, for all or some of the packets generated by the application:
obtaining of a packet of the stream, called first packet, comprising a first header and payload data,
preparation of a second packet by modifying the first header into a second header, based on at least one processing rule conforming to a stream management policy of the operator and at least one parameter of the first header, the second packet comprising the second header and said payload data, transmission of a request message to a security module installed in the terminal, the request message comprising at least one parameter of the first header, reception of a response message from the security module, the response message comprising an instruction relating to the transmission of the second packet, the instruction being based on the at least one parameter and established according to the at least one processing rule, wherein the reception of a response message is followed by addition, in a table, of a routine rule based on the instruction and intended to be applied to packets of the stream following the first packet, transmission by the terminal of the second packet.

2. The control method as claimed in claim 1, wherein the request message comprises the first packet and the response message comprises the second packet.

3. The control method as claimed in claim 1, wherein a packet comprises a header and payload data, and wherein the second packet comprises a header different from the header of the first packet.

4. A method for determining an instruction relating to the transmission of a first packet included in a packet stream generated by an application installed in a mobile terminal, the stream being intended to be transmitted over a communications network managed by an operator, the method being implemented in a security module local to the terminal and comprising at least one processing rule conforming to a stream management policy of the operator, the method comprising:

reception of a request message from the terminal, the request message comprising at least one parameter of a header of a first packet of the stream, determination of an instruction relating to the transmission of a second packet based on the at least one parameter and the at least one processing rule, transmission of a response message to the terminal, the response message comprising the determined instruction, wherein the request message comprises the first packet and the response message comprises the second packet.

5. The determination method as claimed in claim 4, comprising preliminary obtaining the at least one processing rule from a network node managed by the operator.

6. The determination method as claimed in claim 5, wherein a packet comprises a header and payload data, and wherein the second packet based on the first packet comprises a header different from the header of the first packet.

7. The determination method as claimed in claim 4, wherein a packet comprises a header and payload data, and wherein the second packet based on the first packet comprises a header different from the header of the first packet.

* * * * *

UNITED STATES PATENT AND TRADEMARK OFFICE
CERTIFICATE OF CORRECTION

PATENT NO. : 10,594,603 B2
APPLICATION NO. : 15/524335
DATED : March 17, 2020
INVENTOR(S) : Bruno Chatras et al.

Page 1 of 1

It is certified that error appears in the above-identified patent and that said Letters Patent is hereby corrected as shown below:

In the Specification

At Column 8, Line 37, please replace "E2" with – F2 –

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*